United States Patent [19]
Shelley et al.

[11] Patent Number: 5,345,551
[45] Date of Patent: Sep. 6, 1994

[54] METHOD AND SYSTEM FOR SYNCHRONIZATION OF SIMULTANEOUS DISPLAYS OF RELATED DATA SOURCES

[75] Inventors: Monte F. Shelley, Orem; James S. Rosenvall, Provo, both of Utah

[73] Assignee: Brigham Young University, Provo, Utah

[21] Appl. No.: 973,780

[22] Filed: Nov. 9, 1992

[51] Int. Cl.$^5$ .................... G06F 3/14; G06F 9/46; G06F 15/40
[52] U.S. Cl. .................... 395/157; 395/650; 395/144; 395/145; 364/419.19
[58] Field of Search .......... 395/157, 155, 158, 144, 395/145, 148, 146, 650; 364/419.17, 419.18, 419.19, 419.07

[56] References Cited

U.S. PATENT DOCUMENTS

| | | | |
|---|---|---|---|
| 4,428,065 | 1/1984 | Duvall et al. | 395/150 |
| 4,481,603 | 11/1984 | McCaskill et al. | 395/148 X |
| 4,648,067 | 3/1987 | Repass et al. | 395/148 |
| 4,807,142 | 2/1989 | Agarwal | 395/650 |
| 4,813,010 | 3/1989 | Okamoto et al. | 395/600 |
| 5,051,930 | 9/1991 | Kuwabara et al. | 395/148 |
| 5,091,876 | 2/1992 | Kumano et al. | 364/419.03 |
| 5,122,972 | 6/1992 | Richards et al. | 395/157 |

*Primary Examiner*—Raymond J. Bayerl
*Attorney, Agent, or Firm*—Jon C. Christiansen; Lee A. Hollaar; Daniel P. McCarthy

[57] ABSTRACT

A method and system for synchronizing the presentation of data from different, but related, sources in different windows of a computer display. Data is positioned using duplicate sectional names that are in each of the data sources that are being synchronized. Even though the sectional names in each data source are the same, the contents of the sections can be different, independent, and unrelated. Multiple views of a single data source in different windows can be synchronized, showing data from many different locations within each data source. This allows authors and content experts to simultaneously show data from dissimilar data sources that have a logical connection, such as footnotes or commentary to a text, translations of a text, or updates to a read-only file.

23 Claims, 1 Drawing Sheet

Microfiche Appendix Included
(1 Microfiche, 27 Pages)

METHOD AND SYSTEM FOR SYNCHRONIZATION OF SIMULTANEOUS DISPLAYS OF RELATED DATA SOURCES

BACKGROUND OF THE INVENTION

1. Field of the Invention

This invention relates to information presentation on a computer display, and in particular to the display of related data from a plurality of sources.

2. Description of Related Art

It is often desirable to display information from different, but related, data sources simultaneously on a computer display. For example, when viewing the text of a document in one window, or portion, of the computer display, it might be desirable also view footnotes or commentary associated with that text in another window. Another example would be to view a foreign language text in one window and its English translation in another window. A third example would be to view information stored on a read-only medium, such as a compact disk read-only memory (CD-ROM) in one window and updates or corrections to the read-only information in another window.

Such related data sources may be stored in separate files. They may also be portions of the same file with some means of indicating the related data sources within the file, such as indicator codes embedded within the file that mark the extent of each related data source, or a file header indicating the locations of each related data source in the file.

Many computer programs have been developed for displaying two synchronized views of the same data source. In U.S. Pat. No. 4,428,065 (Duvall et al.), a technique for presenting a magnified view in one window of the text being displayed in another window is disclosed. In the WordPerfect text processor, it is possible to split the computer display screen so that the formatted text is displayed in one window and a synchronized view of the same text, but with all the control codes revealed, is displayed in another window. In the WordPerfect "reveal codes" display, the cursor in one window automatically follows the cursor in the second window.

The simplest way of accomplishing simultaneous viewing of information from different, but related, data sources is to use separate text editors, or other means for displaying data in a window, for each of the related sources of data. However, this requires the user to manually synchronize the viewing positions in each of the windows whenever the viewing position of one of the windows is changed. This may involve moving the cursor to another location in the currently-displayed data, or scrolling another portion of the data into the window. This can be difficult and error-prone when the user cannot quickly recognize how the current position in one window relates to the data being displayed in another window.

In U.S. Pat. No. 5,091,876 (Kumano et al.), a method for synchronizing the viewing position of two windows being controlled by a single program is disclosed as part of an automated language translation system. Kumano utilizes a table indicating the starting location for each sentence in both the original text and the translated text. From that table, it is possible to determine the sentence number for the current cursor position in a window, and the starting location for the corresponding sentence in the other window. This permits the program to keep the text displays and cursor positions of both its windows synchronized.

The technique in Kumano is limited in a nun%her of ways. It only operates with windows or text displays controlled by a single program—the program that contains the sentence starting location table. Furthermore, the technique as described by Kumano only operates on related data where there is a one-to-one correspondence between sentences in each data source.

SUMMARY OF THE INVENTION

It is an object of the present invention to provide a flexible means for synchronizing the viewing positions in a plurality of windows controlled by a plurality of computer programs, tasks, or processes.

It is a further object of the present invention to provide this synchronization for different, but related, sources of data.

These objectives are achieved by passing messages between each task controlling a window and a synchronization control task using a means for communications such as shared memory or an inter-process communications facility. When a window-controlling task is first started, it sends a message to the synchronization control task registering it with the synchronization control task.

Whenever there is a change in viewing position to a new section or portion of the data being displayed in the window, the sectional name (as determined from markers in the data) of the new location is sent in a message by the window's controlling task to the synchronization control task. The synchronization control task then sends messages indicating the sectional name to all registered window-controlling tasks. Each window-controlling tasks then updates all the windows associated with them to be positioned at the point corresponding to the sectional name within their data source.

It can be readily observed that the technique just described provides synchronization between any number of windows controlled by a plurality of tasks. It does not require that all synchronized windows be controlled by the same program or task.

It can also be readily observed that the technique Just described provides synchronization of displays of related, but different, data based on duplicate sectional names embedded in the data. The sectional names do not even have to be letter-for-letter duplicates if a method is used to equate sectional names in one document with related sectional names in another document. For example, the English Bible book name of John could be equated with the German Bible book name of Johannes. Such cross-document sectional equates could be obtained from tables of sectional names, or from automated cross references created by scanning the sectional names from various documents, or any other means for establishing lists of sectional names.

This utilization of sectional names allows, for example, one window to be positioned at a footnote reference and a synchronized window to be positioned at the text of the footnote. It also allows one window to be at a location within an English language text and a synchronized window to be at the corresponding section in a foreign translation, regardless of whether the original text and the translation have the same number of characters or sentences within the section.

These and other features of the invention will be more readily understood upon consideration of the

DETAILED DESCRIPTION OF THE INVENTION

Figure 1:
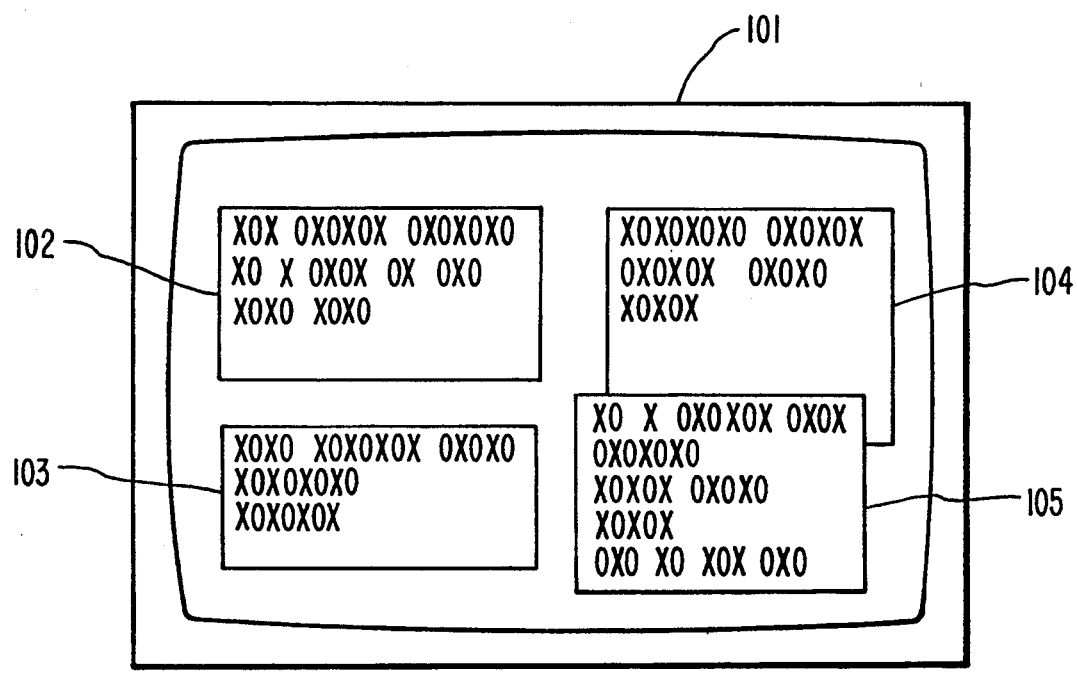
FIG. 1 illustrates a computer display with four synchronized windows whose data comes from different, but related sources.
Figure 2:
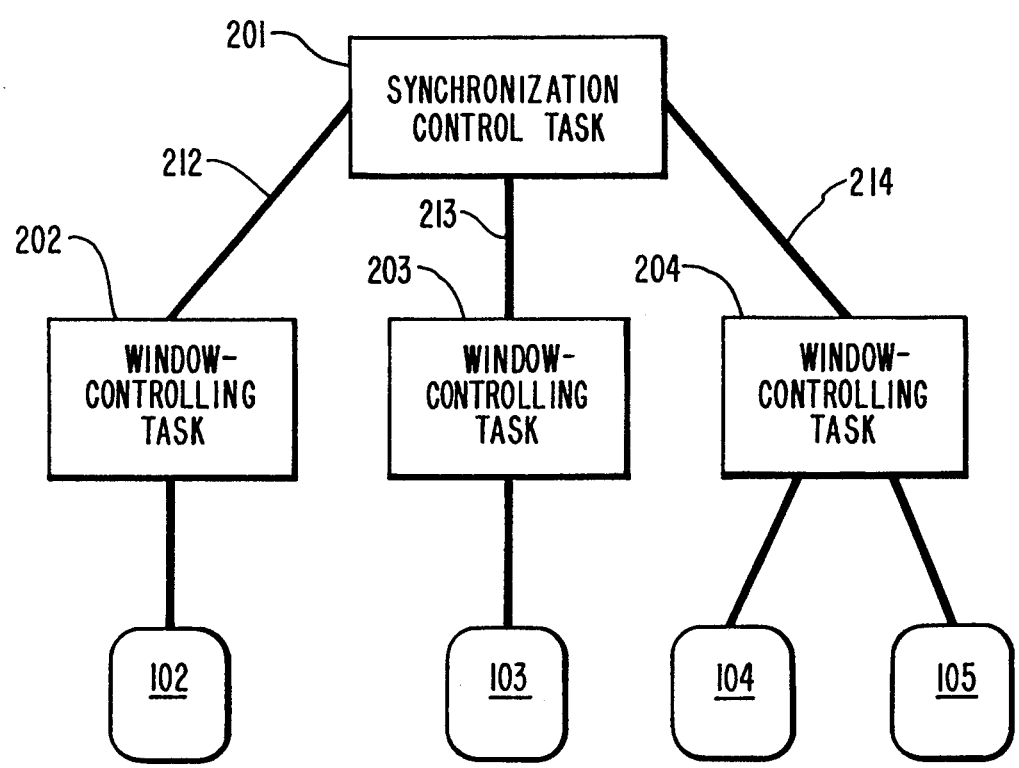
FIG. 2 is a block diagram having three window-controlling tasks, the synchronization control task, and a means for communications between these tasks.

FIG. 1 illustrates a computer display 101 with four windows 102, 103, 104, and 105. Each is capable of displaying information in the form of text or graphics independently of any other window on computer display 101. Each window is under the control of some task, such as a text editor, document formatter, graphical display program, or other window-controlling task. FIG. 2 shows the four windows 102, 103, 105, and 105 of FIG. 1 and their window-controlling tasks. Window 102 is controlled by window-controlling task 202, window 103 by window-controlling task 203, and both windows 104 and 105 by window-controlling task 204.

As used herein, a task is a stand-alone application or a subprogram that is run as an independent entity. In other words, a digital computer will have the set of machine instructions constituting one or more tasks in its memory, and is capable of executing the instructions of one task independently of the instructions and state of any other task runable on that digital computer. The digital computer will have means for executing machine instructions and have attached to it means for storing those instructions. Storage means include a variety of memory systems, including random-access read-write memory (RAM), read-only memory (ROM), floppy disks, hard disks, compact-disc read-only memory (CD-ROM), and magnetic tapes.

Each window-controlling task is capable of displaying information taken from a specified data source, and can change its viewing position based of commands from the user viewing the data in the form of cursor movements through a keyboard or mouse, scrolling commands to move up or down some amount (such as a page), searching commands to move to the location of a specified item, or hypertext commands that change the current view to a location specified in a link embedded within the displayed information. Following any of these user-specified changes in viewing position, a window-controlling task can determine its position within the information it is displaying.

A window-controlling task can also change its viewing position based on a request transmitted from a synchronization control task 201 using some means for communications. In FIG. 2, the communications means is illustrated schematically by links 212, 213, and 214 between synchronization control task 201 and window-controlling tasks 202, 203, and 204, respectively. Such communications means can be implemented using an inter-process communications facility appropriate to the particular computer and window system on which the invention is running, or any other technique for allowing two tasks to exchange messages. Such inter-process communications facilities include memory locations shared between the processes, operating system calls to move information between tasks, or network communications implementations.

To illustrate the basic function of the synchronization system, assuage that the user has changed the viewing position of the information being displayed in window 102. The new viewing position will be determined by window-controlling task 202, and a message containing a description of the new viewing position will be sent to synchronization control task 201 using communications link 212.

When the message indicating the new viewing position from window-controlling task 202 has been received by synchronization control task 201, synchronization control task 201 consults a table that contains the identities for all window-controlling tasks. This table is dynamically maintained through communications from the window-controlling tasks and synchronization control task 201. Whenever a window-controlling task is started, that window-controlling task sends a message to synchronization control task 201 indicating that it is running and needs to receive appropriate synchronization messages. This causes synchronization control task 201 to place an entry describing the starting window-controlling task into its table of window-controlling tasks. Whenever a window-controlling task is terminating, it sends a message to synchronization control task 201 indicating that it is terminating, causing synchronization control task 201 to remove it from its table of window-controlling tasks.

Whenever synchronization control task 201 receives a message from a window-controlling task indicating a change in viewing position (such as the one from window-controlling task 202 in this example), it sends a message to all window-controlling tasks in its table (with the possible exception of the window-controlling task that sent the original message indicating the change in viewing position) that instructs those window-controlling tasks to change their viewing position to that indicated in the message. In the example, synchronization control task 201 will send the viewing position change request message to window-controlling task 203, which will change the display in window 103, and window-controlling task 204, which will change the display in windows 104 and 105.

From the above discussion, it should be readily apparent that the system discussed above provides a general means for the change in viewing position in one window to be reflected in changes in viewing positions in all other windows. The effect of such changes in viewing positions depends on the nature of the viewing-position information passed in the messages described above.

If all windows were displaying the same information, such as text from the same file, the viewing-position information could be the number of characters from the start of the file to the current viewing, or cursor, position. This would result in all windows displaying the same text and their cursors in the same location, regardless of which window's cursor location is changed.

Because it does not depend on a single program to keep the windows synchronized, but utilizes a number of tasks linked together by a communications means, the present invention permits the synchronization of windows displayed on a plurality of computers, not Just windows on a single display. The communications means would be a network connection or other link between the plurality of computers. The synchronization control task could run on one of the plurality of computers, or on another computer. This would permit a number of users to view the same file at separate machines, with the same text displayed in the window on each machine and the cursor in the same location.

Another mode of operation that is possible when the viewing-position information is more complex than the simple character location within a file, and when a plurality of windows are displaying information from different, but related, sources. For example, if the viewing-position information were the sentence number relative to the start of the file for the current cursor location, and one window had as its data source a foreign language text and another window had as its data source a sentence-by-sentence English translation of that foreign language text, the present invention would display the information in a manner similar to that describe in the Kumano et al. patent previously described.

Note, however, that the mechanism for producing the displays is distinctly different between the two systems. In Kumano, there are two windows controlled by a single program. In the present invention, there are an arbitrary number of windows controlled by a plurality of window-controlling tasks, all communicating with the synchronization control task.

If the viewing-position information is based on sectional, or contextual, information rather than character location or sentence number, even more complex display control is possible. Consider, for example, if the viewing-position information were the particular sections of a document (title, author, abstract, introduction, first section, second section, etc.), and the data again were from a foreign language text and its English translation. In this case, the two windows would remain synchronized even though the corresponding sections in the two data sources do not necessarily have the same number of characters or sentences.

As another example, if the sectional information were based on footnote references within a document, one window could display the document and another window could display the footnotes synchronized to the first window.

While in many embodiments of the present invention the comparison of the sectional name in the viewing-position information against sectional names within a data source will be a simple character string comparison, other techniques can be used without departing from the spirit of the invention. One such technique would be to replace the received sectional name with an equivalent sectional name using a table of sectional equates that indicates equivalent sectional names before comparison. This could support, for example, sectional names expressed in different languages. This replacement could be performed by either the window-controlling task or the synchronization control task.

Obviously, if the viewing-position information is based on sectional names within a data source, the window-controlling task must have means for knowing the sectional name where the current viewing position is located, and must also have means for changing its viewing position to the location indicated by a particular sectional name.

Such means for knowing the sectional name may involve scanning backward through the data source whose viewing position has changed to find the particular sectional name for the new viewing-position information, and means for changing viewing position may involve scanning through the data source for the other windows to locate the corresponding sectional name.

The means for knowing the sectional name and means for changing the viewing location can also use techniques common to text information retrieval to improve their performance over scanning through the data source, such as pre-indexing the text information and then using the index information to rapidly position to a particular location identified by an embedded sectional name. Such techniques are well-known to those skilled in the art of information searching and retrieval, and will not be described in detail here. The use of such techniques is in the spirit of the present invention, and does not depart from its scope.

It is clear that the information that comes from the plurality of different data sources should contain the same sectional names (or equivalent sectional names if a table of sectional equates or other means for providing equivalent sections names is being used) for the present invention to work best, although they do not necessarily have to occur in the same order. However, in the preferred embodiment of the invention special handling occurs whenever a request for a new viewing position is received by a window-controlling task and the sectional name in that request does not occur in the data source for a window controlled by that window-controlling task.

In the preferred embodiment, a window-controlling task can be in one of two modes: hide mode and proximity mode. In hide mode, if a window-controlling task receives a viewing-position request containing a sectional name not present in the data source for its window, the window-controlling task makes the window disappear from the screen using the appropriate window manager request. When the window-controlling task later receives a viewing-position request containing a sectional name that is present in the data source, it makes the window visible again and positions the information to the proper position.

Hide mode is useful, for example, when the information being displayed in the window does not occur throughout the main document being viewed, such as figures or footnotes. It causes the display of the appropriate footnote or figure when the corresponding portion of the document text is being viewed, and causes the figure or footnote window to disappear when there is nothing to be viewed.

In the second mode, proximity mode, when a window-controlling task cannot find the requested sectional name, it sends a request through the synchronization control task to the window-controlling task that originated the repositioning, requesting that it supply another sectional name—one that might be present in the data source. When a sectional name that is in both related data sources is found, the viewing position is set to that location.

A further refinement in the preferred embodiment is to allow a window-controlling task to specify that it is part of a designated group. In this case, the synchronization control task sends viewing position change requests only to those window-controlling tasks in the same group as the window-controlling task making the original request. It also permits the starting of a series of window-controlling tasks from a master window-controlling task, indicating the data source for each of the started window-controlling tasks. It can also send a message through the synchronization control task to all window-controlling tasks in a group to request that they terminate.

A Microfiche Appendix accompanying this Specification contains computer source code which illustrates one implementation of our invention in one of its preferred embodiments. For brevity, only those portions of the computer source code which illustrate the inventive concepts are included. The Microfiche Appendix is hereby incorporated by reference and all that it discloses is intended to be deemed within the body of this Specification.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

We claim:

1. A system for synchronizing the presentation of data on a digital computer display, comprising:
    first and second window-controlling means, each of said window-controlling means displaying information in at least one display window,
    a synchronization control means, and
    means for communications between said synchronization control means and each of said first and second window-controlling means;
    wherein said first window-controlling means displays first information from a first source, and said second window-controlling means displays second information from a second source;
    wherein said first information and said second information have sections, and at least one section of said second information corresponds to a section of said first information;
    wherein said first window-controlling means sends a message to said synchronization control means over said means for communications indicating a change in viewing position to a new section of said first information;
    wherein said synchronization control means sends a message to said second window-controlling means over said means for communications requesting a change in viewing position to a section of said second information corresponding to said new section of said first information; and
    wherein said second window-controlling means displays said corresponding section of said second information on at least one display window.

2. A system as in claim 1 wherein said message indicating a change in viewing position includes a sectional name.

3. A system as in claim 2 wherein said second window-controlling means makes at least one of its display windows disappear when said message requesting a change in viewing position contains a sectional name that is not present in said second information being displayed by said second window-controlling means.

4. A system as in claim 1 wherein said first information includes text in one language, and said second information includes corresponding text in another language.

5. A system as in claim 1 wherein one of said first information or said second information includes text, and the other of said first information or said second information includes corresponding footnotes.

6. A system as in claim 1 wherein one of said first information or said second information includes information from a read-only memory, and the other of said first information or said second information includes updates or corrections to said information from said read-only memory.

7. A system as in claim 1 wherein said means for communications is an inter-process communications facility.

8. A system as in claim 1 wherein said means for communications is a shared memory.

9. An apparatus as in claim 1 wherein said means for communications is a network connection.

10. An apparatus for synchronization the presentation of data on a digital computer display, comprising:
    one or more digital computers, each capable of executing one or more tasks,
    a plurality of window-controlling tasks, each of said window-controlling tasks controlling at least one display window, each window-controlling task being executed on one of said one or more digital computers,
    a synchronization control task being executed on one of said one or more digital computers, and
    means for communications between said synchronization control task and said plurality of window-controlling tasks;
    wherein one said display window controlled by one said window-controlling task displays first information from a first source, and another said display window controlled by another window-controlling task displays second information from a second source;
    wherein said first information and said second information have sections, and at least one section of said second information corresponds to a section of said first information;
    wherein one of said plurality of window-controlling tasks sends a message to said synchronization control task over said means for communications indicating a change in viewing position to a new section of said first information;
    wherein said synchronization control task sends a message to said another of said plurality of window-controlling tasks over said means for communications requesting a change in viewing position to a section of said second information corresponding to said new section of said first information; and
    wherein said another window-controlling task displays said corresponding section of said second information on at least one display window.

11. An apparatus as in claim 10 wherein said message indicating a change in viewing position includes a sectional name.

12. An apparatus as in claim 11 wherein one of said window-controlling tasks comprises means for making at least one of its display windows disappear when said message requesting a change in viewing position contains a sectional name that is not present in said information being displayed by that window-controlling task.

13. An apparatus as in claim 10 wherein said first information includes text in one language, and said second information includes corresponding text in another language.

14. An apparatus as in claim 10 wherein said first information includes text, and said second information includes corresponding footnotes.

15. An apparatus as in claim 10 wherein said first information includes information from a read-only memory and said second information includes updates or corrections to said first information.

16. An apparatus as in claim 10 wherein said means for communications is an inter-process communications facility.

17. An apparatus as in claim 10 wherein said means for communications is a shared memory.

18. An apparatus as in claim 10 wherein said means for communications is a network connection.

19. A process capable of being executed on a digital computer for synchronizing the presentation of information from a first source and a different second source on a digital computer display, each of the information being presented having sections and at least one section of the information from said second source corresponding to a section of the information from said first source, comprising:
   a first window-controlling task recognizing a change in viewing position in a first display window to a new section,
   said first window-controlling task sending a first message to a synchronization control task indicating said change in viewing position in said first display window,
   said synchronization control task sending a second message to a second window-controlling task in response to said first message received by said synchronization control task, and
   said second window-controlling task positioning at least one display window associated with said second window-controlling task to a section corresponding to said new section.

20. A process as in claim 19, wherein said first message includes a sectional name and wherein said second message includes said sectional name from said first message.

21. A process as in claim 20, further comprising said second window-controlling task causing said at least one display window associated with said second window-controlling task to disappear if said sectional name is not present in said second source.

22. A process as in claim 20, further comprising said synchronization control task replacing said sectional name with an equivalent sectional name based on a table of sectional equates that indicates equivalent sectional names.

23. A process as in claim 20, further comprising said second window-controlling task replacing said sectional name with an equivalent sectional name based on a table of sectional equates that indicates equivalent sectional names.

* * * * *